Figure 5:
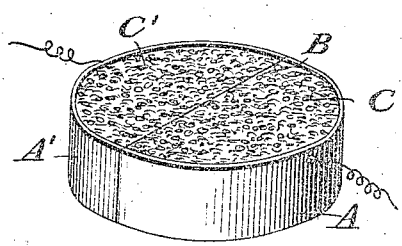

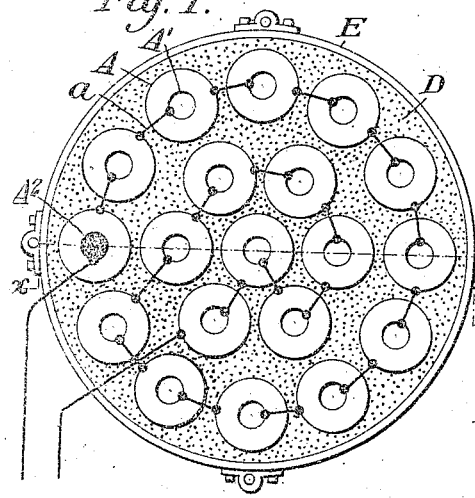
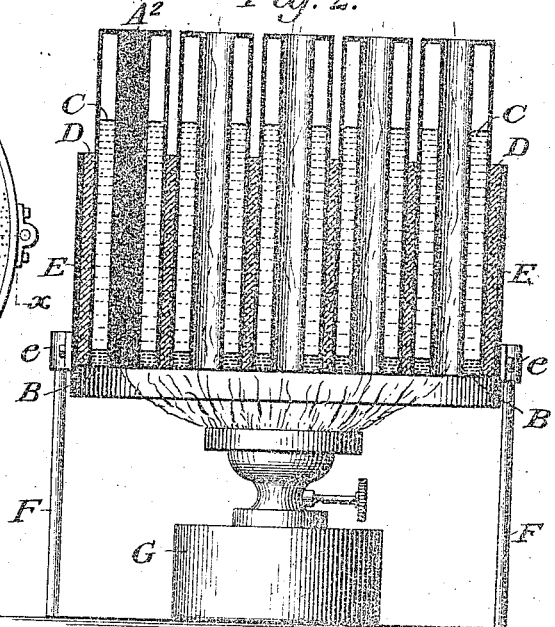
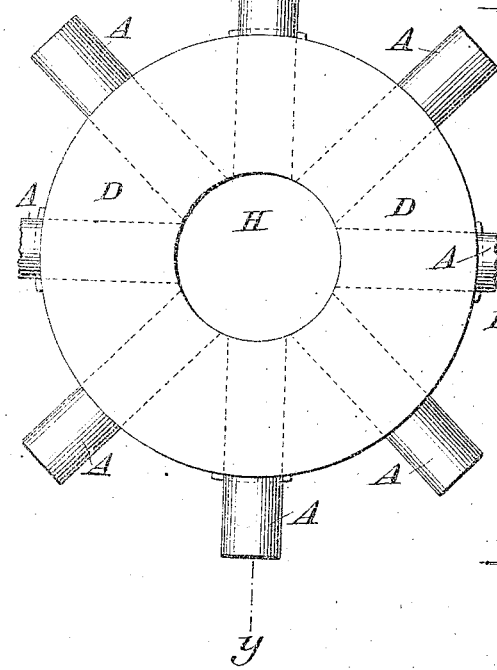
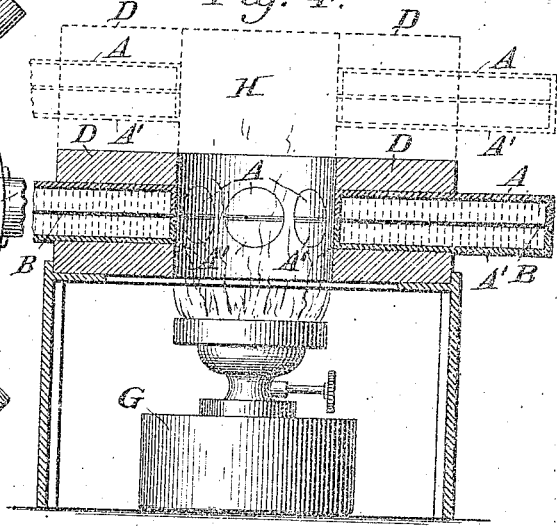

No. 713,652. Patented Nov. 18, 1902.
I. KITSEE.
THERMO-ELECTRIC GENERATOR.
(Application filed Feb. 9, 1900. Renewed Apr. 19, 1902.)
(No Model.)
2 Sheets—Sheet 2.

Witnesses
Inventor

UNITED STATES PATENT OFFICE.

ISIDOR KITSEE, OF PHILADELPHIA, PENNSYLVANIA.

THERMO-ELECTRIC GENERATOR.

SPECIFICATION forming part of Letters Patent No. 713,652, dated November 18, 1902.

Application filed February 9, 1900. Renewed April 19, 1902. Serial No. 103,871. (No model.)

*To all whom it may concern:*

Be it known that I, ISIDOR KITSEE, of the city and county of Philadelphia, State of Pennsylvania, have invented certain new and useful Improvements in Apparatus for Thermo-Electric Generators, of which the following is a specification.

My invention relates to thermo-electric generators, and has for its object the production of a thermo-electric generator economical in its working and simple in its construction. To accomplish this, I have recourse to the method and arrangement as hereinafter specified, and more particularly pointed out in the claims following this specification.

In so-called "thermo-electric" cells the current of electricity is generated through the action of heat on the junction of two metallic bodies the opposite ends of which are protected from the influence of the heat, and a device such as a thermo-cell, where the metallic junction is the disturbed medium, should only be capable of generating a current of very low potential, and, in reality, the electromotive force of the best constructed thermo-cell is only a small fraction of the voltage a Daniel cell is capable of giving. I may add here that as in frictional machines the glass plate is the real agent of generating the current, its molecular changes, due to friction, being the cause of the developed electrical energy, so the molecular changes of the steam in the hydro-electric machine and the conducting-coils of an armature of a dynamic machine may be considered as the developing or active agent, and the electrolyte in a chemical cell, or the heated junction in a thermo-cell.

All devices named as generators of electricity are alike in the respect that they must have a medium capable of undergoing molecular changes, and the only difference between them is that the friction-machine has, for instance, a glass plate, for which steam is substituted in the hydrofriction-machine and metallic coils are substituted in the dynamic machine, so aqua solutions are substituted in the chemical cell and heated metals in the thermo-cell.

If two metals—say one an alloy of antimony and the other the alloy of bismuth—be joined together on one hand and the joined ends be heated, a very feeble current of electricity will be developed; but if these joined ends be separated and a crystalline compound which possesses in itself the water of crystalization be interposed between the separated ends and the junction is again heated the formerly feeble current will now be a current of comparatively great intensity or potential, and my experiments have also shown that such potential depends on the difference of the metals to be heated and also on the nature of the crystalline compound and also upon the temperature employed. My experiments have also shown that acetate of soda in its crystalline state is well adapted for the intervening medium between the two junctions; but I do not wish to limit myself to the employment of acetate of soda, as acetates of other metals or metallic salts other than acetates can be employed without departing from my invention, and as to the metals it is well known that all metallic bodies are more or less adapted to serve in thermo-batteries.

In carrying out my invention different means may be employed—as, for instance, the device may consist of two metals which if heated at one junction are capable of indicating different potentials, and a crystalline compound may be added to these metals at their point of junction in such a way as to constitute a separating medium between said metals at the place where the heat is applied, or a porous medium of higher resistance than the metals themselves may be saturated with a crystalline compound and be used as the separating medium, or a material, the resistance of which changes with a change of temperature, may be employed as a separating medium. So, also, may the two metals be shaped so as to form a containing vessel, a porous partition dividing said containing vessel into two compartments, and each compartment be filled with a crystalline compound possessing chemical properties different from each other or capable of reacting upon each other. In other words, a device may be constructed in which only the heating effects of the different metals plus the change due to the heating of the crystalline material are the sole sources for generating the current, or the heating effects of the metals plus the heating and chemical changes due to the presence of the crystalline structure may be utilized in the generation of electric currents, or such generation may be due to the heating effects of the metals as well as the chemical reaction of one crystalline compound on one of the metals or two crystalline compounds upon each other. The device can therefore be used as a thermo-generator pure and simple or as a thermo-chemical generator.

One of the objects of my invention, therefore, being to vary the intensity or electromotive force of a thermo-electric generator, the same may be carried into effect by means of the arrangement, as illustrated in the accompanying drawings and particularly pointed out in the claims, forming part of this specification.

Figure 6:
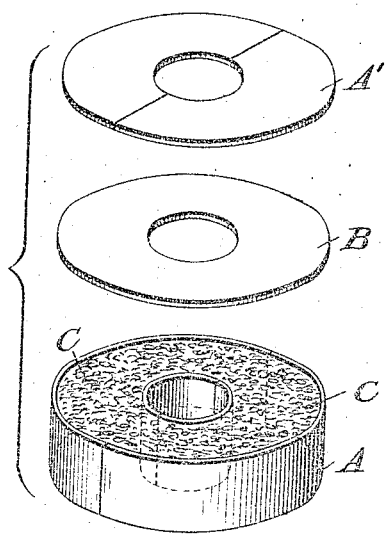
Figure 7:
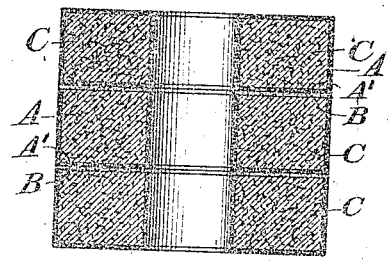
Figure 8:

Referring to the drawings, Figure 1 is a plan view of a device embodying my invention. Fig. 2 is a sectional view on the line $x\,x$ of Fig. 1. Fig. 3 is a plan view of a modified form of device embodying my invention, and Fig. 4 is a sectional view of such modification on the line $y\,y$ of Fig. 3. Fig. 5 is a perspective view of a device embodying my invention in which two different crystalline compounds are employed. Fig. 6 is a perspective view of a device in which but one crystalline compound is employed. Fig. 7 is a sectional elevation of a device in which three devices similar to that shown in Fig. 6 are combined. Fig. 8 is a front elevation of a modified device.

In Figs. 1 and 2, which illustrate the device as an entirety, consisting of a number of independent generators connected together electrically in series, A is an outer tube, in which is placed an inner tube of smaller diameter A', separated from the outer tube A by the porous insulating material B. Such material may be asbestos, porous clay, or any other suitable material. Part of the space separating the outer tube A from the inner tube A' is filled with a crystalline compound C, which crystalline compound may be any of the chemical compounds capable of melting in their water of crystallization or construction through the instrumentality of heat. The whole series of pipes are embedded through part of their length in a material D capable of withstanding the action of heat—such, for instance, as fire-clay. The whole may then be encircled by a frame or support E and placed on a supporting-stand F over a source of heat G. Each pair of tubes are electrically connected to the succeeding pair through the metallic contact $a$. In this device at normal temperature no electrical energy will be developed; but as soon as the junctions of the different tubes are heated a difference of potential is manifested between the outer tubes and their corresponding inner tubes, (it being understood that the metal of the outer tubes differs in its composition from the metal of the inner tubes,) at the same time the crystalline compound melting and in part penetrating the porous insulating compound not only affords a path for the current between the outer and inner tubes, respectively, but also adds to the intensity of the current. In this device the heat may be made to impinge only upon the lower part of the tubes, and in such case the lower part of the space of the inner tubes should be closed by the fireproof material D, or a solid metallic rod may be substituted in such case for the inner tubes, as shown in Fig. 2 at $A^2$, or the inner spaces of the inner tubes may be left free and the heat be allowed to impinge upon the surface thereof throughout any part of their length.

In Figs. 3 and 4 the double tubes of Figs. 1 and 2 are replaced by one tube composed of two half-tubes A and A', separated from each other by the dividing medium B and provided also with a crystalline material C. A number of such tubes are held in position by the intervening fireproof material D. As is illustrated in Figs. 1, 2, 3, and 4, respectively, the generating devices in the former figures are in a vertical and in Figs. 3 and 4 in a horizontal position.

In the last-named figures, H is the space or opening for the flame or heat of the heating device G.

In Fig. 5 the device consists of the receptacle A and A', having a dividing-partition B, said partition being of porous material and dividing the inner space into two compartments, each of these compartments being filled with a different crystalline material C C', one half of the containing box or vessel constituting the positive sign and the other half the negative sign of the cell or battery. If one junction of the vessel be heated, the difference of potential will not only be equal to the difference in the metallic junction, but will also include the difference of potential developed by the two crystalline compounds upon each other, and it is obvious if only the potential developed by the action of the two compounds upon each other should be utilized then the two parts of the vessels may be of the same metal.

In Figs. 6 and 7, where A is the vessel, C is the crystalline compound, A' the metallic cover for vessel A, B the porous dividing medium between A and A'.

In Fig. 8, A A' represent two metallic bars, and C a piece of selenium separating the bars A A' at their point of junction.

Having thus described my invention, what I claim as new, and desire to secure by Letters Patent, is—

1. A thermo-electric cell consisting of two conductors, and interposed between them a material normally in its solid state but melting in its water of crystallization, if subjected to heat.

2. A thermo-electric cell consisting of a material of comparatively high resistance, said material being impregnated with a material capable of melting in its water of crystallization, and a positive and negative electrode in contact with said material of high resistance.

3. A thermo-electric cell consisting of a porous material impregnated with a material capable of melting in its water of crystallization, said porous material dividing positive and negative electrodes.

4. A thermo-electric cell consisting of two conductors, separated by a material solid and non-conducting at a low temperature, but fluid and conducting at a temperature higher than the normal.

In testimony whereof I hereby sign my name, in the presence of two subscribing witnesses, this 5th day of February, 1902.

ISIDOR KITSEE.

Witnesses:
    EDITH P. STILLEY,
    A. F. RUTHERFORD.